United States Patent
Scherb

(10) Patent No.: US 10,056,704 B2
(45) Date of Patent: Aug. 21, 2018

(54) HIGH VOLTAGE CONNECTION AND METHOD FOR MANUFACTURING A HIGH VOLTAGE CONNECTION

(71) Applicant: Tesat-Spacecom GmbH & Co. KG, Backnang (DE)

(72) Inventor: Volker Scherb, Aspach (DE)

(73) Assignee: Tesat-Spacecom GmbH & Co. KG (DE)

( * ) Notice: Subject to any disclaimer, the term of this patent is extended or adjusted under 35 U.S.C. 154(b) by 9 days.

(21) Appl. No.: 15/413,555

(22) Filed: Jan. 24, 2017

(65) Prior Publication Data
US 2017/0222337 A1  Aug. 3, 2017

(30) Foreign Application Priority Data
Jan. 29, 2016  (DE) .................. 10 2016 000 921

(51) Int. Cl.
| | |
|---|---|
| *H01R 4/00* | (2006.01) |
| *H01R 4/72* | (2006.01) |
| *H01R 4/18* | (2006.01) |
| *H01R 43/00* | (2006.01) |
| *H01R 43/048* | (2006.01) |
| *H01R 43/26* | (2006.01) |
| *H02G 3/04* | (2006.01) |
| *H01R 13/426* | (2006.01) |
| *H01R 13/53* | (2006.01) |

(Continued)

(52) U.S. Cl.
CPC .............. *H01R 4/72* (2013.01); *H01R 4/183* (2013.01); *H01R 13/426* (2013.01); *H01R 13/53* (2013.01); *H01R 43/005* (2013.01); *H01R 43/04* (2013.01); *H01R 43/048* (2013.01); *H01R 43/26* (2013.01); *H02G 3/0468* (2013.01); *H02G 15/013* (2013.01); *H02G 15/1806* (2013.01); *H01R 4/726* (2013.01); *H01R 13/5216* (2013.01)

(58) Field of Classification Search
CPC ........ H01R 4/72; H01R 4/183; H01R 14/426; H01R 13/53; H01R 43/005; H01R 43/04; H02G 3/0468; H02G 15/013
USPC .................. 174/74 R, 77 R, 78, 84 R, 88
See application file for complete search history.

(56) References Cited

U.S. PATENT DOCUMENTS

| | | | |
|---|---|---|---|
| 4,159,860 A * | 7/1979 | Broad ................... | H01R 13/53 174/73.1 |
| 6,281,442 B1 | 8/2001 | Guzowski | |

(Continued)

FOREIGN PATENT DOCUMENTS

| | | |
|---|---|---|
| DE | 100 55 102 A1 | 8/2002 |
| EP | 1 009 083 A2 | 6/2000 |

(Continued)

OTHER PUBLICATIONS

EP 17151415.1 Search Report dated Jun. 2, 2017.

*Primary Examiner* — William H Mayo, III
(74) *Attorney, Agent, or Firm* — Lerner, David, Littenberg, Krumholz & Mentlik, LLP

(57) ABSTRACT

A high voltage connection between a first line of a traveling wave tube and a second line of a voltage supply unit for the traveling wave tube includes a plug which is connected to an end section of the first line or of the second line by a crimp connection, and a socket which is connected to an end section of the other line by a crimp connection. Furthermore, a method for manufacturing a high voltage connection is also described.

11 Claims, 1 Drawing Sheet

(51) Int. Cl.
  *H01R 43/04* (2006.01)
  *H02G 15/013* (2006.01)
  *H02G 15/18* (2006.01)
  *H01R 13/52* (2006.01)

(56) References Cited

U.S. PATENT DOCUMENTS

| | | | | |
|---|---|---|---|---|
| 7,306,469 | B1* | 12/2007 | Slautterback | H01R 13/633 |
| | | | | 439/593 |
| 7,364,454 | B2* | 4/2008 | Brus | H02G 15/103 |
| | | | | 174/84 R |
| 7,767,909 | B2* | 8/2010 | Krabs | H01R 4/726 |
| | | | | 174/84 C |
| 7,980,873 | B2* | 7/2011 | Emerson | E21B 43/128 |
| | | | | 174/84 R |
| 8,141,593 | B2* | 3/2012 | Francois | H02G 15/1833 |
| | | | | 138/110 |
| 9,184,576 | B2* | 11/2015 | Vallauri | H02G 15/1826 |
| 9,537,230 | B2* | 1/2017 | Pope | H01R 4/72 |
| 2002/0055300 | A1* | 5/2002 | Scherb | H01R 4/72 |
| | | | | 439/523 |
| 2009/0181583 | A1* | 7/2009 | Krabs | H01R 4/726 |
| | | | | 439/738 |

FOREIGN PATENT DOCUMENTS

| | | | |
|---|---|---|---|
| EP | 1 835 567 | A2 | 9/2007 |
| GB | 1 482 918 | A | 8/1977 |

* cited by examiner

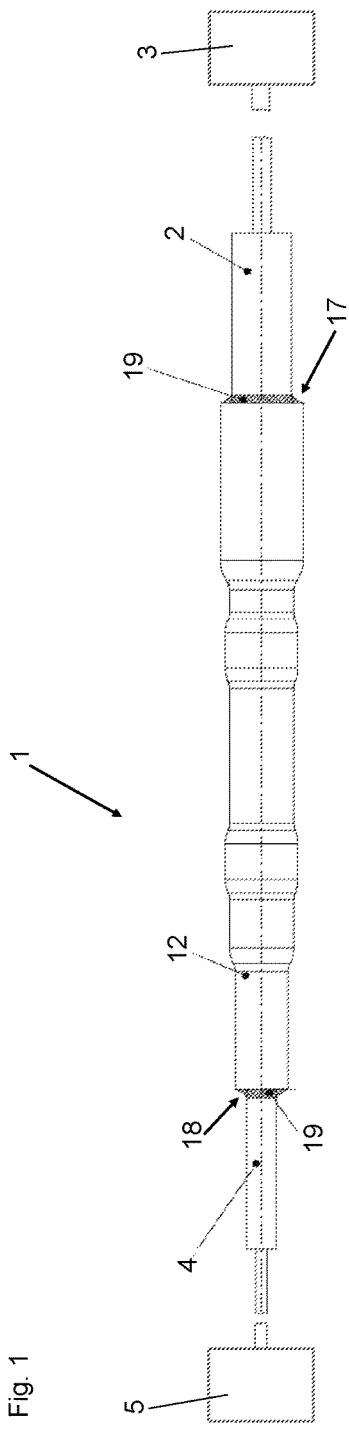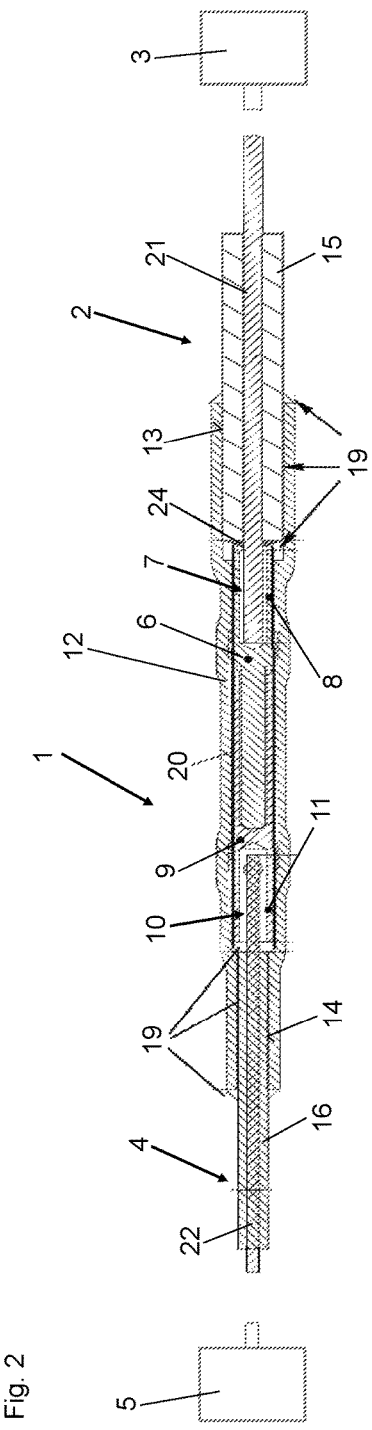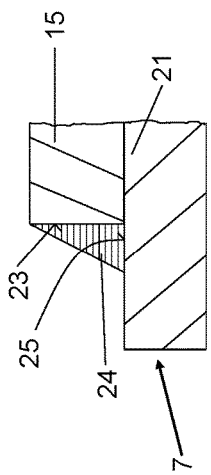

HIGH VOLTAGE CONNECTION AND METHOD FOR MANUFACTURING A HIGH VOLTAGE CONNECTION

FIELD OF THE INVENTION

The disclosure relates to a high voltage connection between a travelling wave tube (TWT) and a voltage supply unit (electronic power conditioner, EPC) for the traveling wave tube. In particular, the disclosure relates to a high voltage connection between a first line (or wire) of the traveling wave tube and a second line (or wire) of the voltage supply unit.

BACKGROUND OF THE INVENTION

In the course of a progressive miniaturization and at the same time increasing high voltages in the technical field of traveling wave tube amplifiers which are utilized especially in the satellite technique and space flight, there may be a need for a light weight, compact, and high voltage suitable connection between the traveling wave tube and the voltage supply unit via the first and the second line.

It is known to connect end sections of the first line and the second line by a splice connection (eyelet) with each other. However, it is very time-consuming to establish such a connection, disconnect it, and maintain it. Furthermore, such connections are tested only up to about 7 kV. Furthermore, solutions are known according to which the lines are soldered or cast together, which, however, has the drawback that in case of repair the entire assembly of the traveling wave tube and the voltage supply unit must be possibly scrapped, which may result in high costs.

BRIEF SUMMARY OF THE INVENTION

Starting therefrom, there may be a need to provide a high voltage connection of the type mentioned at the beginning, which high voltage connection overcomes the drawbacks mentioned above.

The high voltage connection between a first line of a traveling wave tube and a second line of a voltage supply unit for the traveling wave tube comprises a plug which is connected to an end section of the first line or the second line by a crimp connection, and a socket (or jack) which is connected to an end section of the other line by a crimp connection.

In other words, a plug may be affixed at the end section of the first line by means of a crimp connection and a socket may be affixed at the end section of the second line by means of crimp connection, or vice versa. In particular, the end sections may be formed here by strands of the corresponding lines. The high voltage connection may be established and disconnected by means of the plug and the socket. In particular, the plug may be a plug which is suitable for space flight or which is already qualified for space flight. In particular, the socket may likewise be a socket which is suitable for space flight or which is already qualified for space flight. The plug and the socket may be customary and may be available for various diameters, e.g., AWG 20 to AWG 30, thereby enabling a combination of different line thicknesses, in particular wire thicknesses, of the first line and the second line. The high voltage connection is particularly characterized by a lightweight and compact design. Furthermore, it is inexpensive to manufacture, simple to disconnect, and, hence, repair-friendly. Furthermore, it can be utilized for DC voltages to be transmitted of at least up to 10 kV.

According to an embodiment it is provided that the plug and the socket are shrunk over by a shrinking hose, wherein the shrinking hose overlaps the plug and the socket and firmly lies on isolation surfaces of isolations of the first line and the second line.

Preferably, the shrinking hose is space flight qualified and high voltage proof or high voltage resistant. For example, it may be made of a material based on polyethylene. The isolations form an outer casing or envelope of the lines, wherein preferably strands with single wires are located within the isolations. The shrinking hose may be shrunk directly onto the plug and the socket, thereby already providing a high voltage connection which is suitable for use in vacuum. However, alternatively—as to enable transmission of especially high voltages—it may also be provided that the shrinking hose is shrunk onto a further shrinking hose which is conductive on its inside, and which, in turn, is shrunk directly onto the plug and the socket.

Especially advantageously, opposite end sections of the shrinking hose may be sealed with the respective isolation surface of the first line and the second line by means of an adhesive. Such a high voltage connection is suitable for use in the minimum according to Paschen's law. In particular, the adhesive may be a glue which is based on epoxy resin or polyurethane. Prior to sealing with the adhesive, the surfaces to be sealed may be pretreated correspondingly as to ensure an especially good adhesion.

The high voltage connection described above and the related embodiments are particularly suitable for DC-voltages to be transmitted up to about 10 kV. Furthermore, it is lightweight, compact, and repair-friendly.

According to a further embodiment, it is provided that the plug and the socket are shrunk over directly with a shrinking hose which is conductive on its inside, which, in turn, is shrunk over with the shrinking hose described above. Preferably, the shrinking hose which is conductive on its inside is designed for low outgas. The shrinking hose which is conductive on its inside enables that field enhancements at transitions of the plug connection may be levelled or balanced. This embodiment and the embodiments described in the following are furthermore particularly suitable for DC-voltages to be transmitted up to about 10 kV and for higher DC-voltages as well as for a connection where the line of the traveling wave tube and the line of the voltage supply arrangement have strand diameters which vary widely.

According to a further embodiment, the first line comprises a first strand and the second line comprises a second strand, wherein the strands are surrounded by the isolation of the respective line and wherein an end of the first isolation adjacent to an end face as well as a section of the first strand adjacent to the end which is adjacent to the end face are sealed with an adhesive. Alternatively or additionally, an end of the second isolation adjacent to an end face as well as a section of the second strand adjacent to the end which is adjacent to the end face may also be sealed with an adhesive. In this case, the adhesive may form an annular or ring-shaped sealing which lies at an end of the isolation adjacent to an end face for axial sealing and which flares conically towards the end of the isolation adjacent to the end face. This embodiment enables that it may be prevented that larger bubbles or blows or cavities are formed at the end sections of the lines. The risk of blistering is given in particular due to outgasing at the end of the isolation, for example caused during an attempt of vacuum casting or during as a result of heat exposure. Furthermore, blows may be caused by outgasing between the strands and the isolation. Adhesives based on epoxy resin and polyurethane are especially suitable in this context.

Furthermore, it may be provided that the adhesive has a lower volume conductivity than the isolation of the first line or of the second line, as long as here a sealing as described above is also provided. Thereby, the field strain and the risk of blistering may be reduced.

The high voltage connection described above may be overhauled in an especially simple manner, for example in case of assembling it not correctly or if the traveling wave tube must be changed. The plug and the socket can be disconnected from each other in a simple manner. The at least one shrinking hose—given that it is provided—can be cut in or carved on its surface by a sharp scalpel, for example. By heat input, for example by a hot-air fan, the at least one shrinking hose can be removed along the cut manually or by means of a toothpick, for example. Even the adhesive can be removed easily and almost free of any residues by heat input and utilizing, e.g., a toothpick. Subsequently, the plug connection of plug and socket can be disconnected. On using adhesives and prior to a renewed establishing of the high voltage connection including an isolation, adhesion on corresponding surfaces can be improved by suitable plasma processes.

The method for manufacturing a high voltage connection comprises providing a first line of a traveling wave tube and a second line of a voltage supply unit, wherein the first line comprises a first strand and the second line comprises a second strand, and wherein the strands are surrounded by an isolation of the respective line. A crimp connection is established between a plug and an end section of the first line or the second line as well as between a socket and an end section of the other line. Furthermore, the plug is connected with the socket.

By providing the crimp connection, in particular required and time-consuming cleaning steps for removing flux agent residues according to known methods, for example, can be omitted. In particular, this is advantageous as cleaning steps may negatively impact the adhesion characteristics of surfaces to be stuck together. Hence, the method is characterized by its simplicity.

According to an embodiment of the method, it is provided that the plug and the socket are shrunk over by a shrinking hose, wherein the shrinking hose overlaps the plug and the socket and firmly lies on isolation surfaces of the isolation of the first line and the second line. In particular, the shrinking hose may be a shrinking hose which is high voltage resistant and suitable for space flight, e.g., made of polyethylene. A high voltage connection according to this embodiment is already suitable for use in vacuum. Advantageously, it may furthermore be provided that multiple shrinking hoses are arranged one above the other, wherein an overlapping or a length-related gradation of the shrinking hoses with respect to each other may be determined by a field calculation, for example. By providing multiple shrinking hoses shrunk over each other, the dielectric strength of the high voltage connection may be increased.

Furthermore, sealing of opposing end sections of the shrinking hose with the respective isolation surface of the first line and the second line by means of an adhesive may be provided. Such a high voltage connection is likewise suitable for use in the minimum according to Paschen's law. In particular, the adhesive may be a glue which is based on epoxy resin or polyurethane. Prior to sealing with the adhesive, the surfaces to be sealed of the lines and of the shrinking hose may be pretreated correspondingly as to ensure an especially good adhesion.

According to a further embodiment, shrinking over the plug and the socket takes place by a shrinking hose which is conductive on its inside, which shrinking hose can be designed as described in connection with the high voltage connection. Furthermore, an end of the first isolation adjacent to an end face as well as a section of the first strand adjacent to the end of the first isolation which is adjacent to the end face are sealed with an adhesive. Alternatively or additionally, an end of the second isolation adjacent to an end face as well as a section of the second strand adjacent to the end of the second isolation adjacent to the end face may also be sealed with an adhesive. For optimal adhesion of the adhesive, the sections to be sealed may be pretreated in particular with plasma. Further, the shrinking hose which is conductive on its inside is shrunk over with at least one further shrinking hose. In particular, the shrunk over shrinking hose which is conductive on its inside and the isolation surfaces may be covered with a thin layer of adhesive, for example on the basis of epoxy resin or polyurethane, and may be shrunk over with a shrinking hose made of polyethylene, for example, or with multiple such shrinking hoses. An impact to the dielectric strength of the high voltage connection may be made by the amount of adhesive (filling of possibly remaining cavities between the first shrinking hose and the end of the isolation of the strands adjacent to an end face) and the number of shrinking hoses shrunk over each other. An overlapping or a longitudinal gradation of the shrinking hoses with respect to each other may be determined by a field calculation, for example.

Furthermore, the end sections with plug, socket, isolations, and shrinking hose which is conductive on its inside may be heated, sealing of the end of the first isolation adjacent to an end face as well as of the section of the first strand adjacent to the end of the first isolation adjacent to the end face may take place in heated state by an adhesive, and subsequently can be cooled down to room temperature, before the shrinking over of the shrinking hose which is conductive on its inside with the at least one further shrinking hose takes place. For example, heating may take place in an oven, e.g., to 70° C. By heating, an existing gas volume can be pressed out of the lines, in particular out of their isolations. Subsequently, the end sections with plug, socket, and shrinking hose which is conductive on its inside can be taken out of the oven and can be sealed with the adhesive in the warm state. Subsequently, the end sections, the plug, the socket, the shrinking hose which is conductive on its inside, and the adhesive of the sealing are cooled down to room temperature, e.g., 20° C. By capillary effect and due to cooling down to room temperature, the adhesive can infiltrate the isolation of the line, thereby filling porous sections of the isolation and curing.

Furthermore, it may be provided that curing of the adhesive for sealing of the end of the first isolation adjacent to an end face as well as of the section of the first strand adjacent to the end of the first isolation adjacent to the end face takes place at room temperature and under overpressure. This enables that the size of possibly occurring blows may be widely reduced.

With respect to further characteristics, effects, and advantageous embodiments of the method and for avoiding repetitions, reference is made to the explanations in connection with the high voltage connection.

BRIEF DESCRIPTION OF THE DRAWINGS

In the following, exemplary embodiments are further elucidated on the basis of the schematic drawings which are not to scale. It is shown in:

FIG. 1 a side view of an exemplary embodiment of a high voltage connection with a crimped plug connection, FIG. 2 a representation of a longitudinal cut of the high voltage connection of FIG. 1 and FIG. 3 a magnified representation of a longitudinal cut of a sealing of the high voltage connection of FIGS. 1 and 2.

DETAILED DESCRIPTION

FIGS. 1 to 3 show a high voltage connection 1 between a first line 2 of a traveling wave tube 3 shown in FIGS. 1 and 2 on the right and a second line 4 of a voltage supply unit 5 for the traveling wave tube 3 shown in FIGS. 1 and 2 on the left.

As is apparent from FIG. 2, a space flight qualified plug 6 is connected to an end section 7 of the first line 2 by a crimp connection 8, and a space flight qualified socket 9 is connected to an end section 10 of the second line 4 by a crimp connection 11. Plug 6 is stuck into socket 9. The first end section 7 is formed by a first strand 21 of the first line 2, and the second end section 10 is formed by a second strand 22 of the second line 4.

Plug 6 and socket 9 are shrunk over with a space flight qualified and high voltage resistant shrinking hose 12, e.g., made of polyethylene. Shrinking hose 12 overlaps plug 6 and socket 9 and firmly lies on a first isolation surface 13 of a first isolation 15 of the first line 2 and on a second isolation surface 14 of a second isolation 16 of the second line 4. Opposing end sections 17, 18 of the shrinking hose 12 are sealed with the respective isolation surface 13, 14 of the first line 2 and of the second line 4 by means of an adhesive 19, e.g., on the basis of epoxy resin or polyurethane. For an especially good adhesion of the adhesive 19, the isolation surfaces 13, 14 may be pretreated correspondingly in accordance with known methods.

Plug 6 and socket 9 are directly shrunk over with a shrinking hose 20 which has low outgas and which is conductive on its inside, and which, in turn, is shrunk over with a space flight qualified and high voltage resistant shrinking hose 12 which overlaps the shrinking hose 20 that is conductive on its inside.

The first strand 21 is located inside the first isolation 15 and the second strand 22 is located inside the second isolation 16. As especially good apparent from FIG. 3, an end face 23 of the first isolation 15 is sealed by means of an adhesive 24, e.g., on the basis of low outgasing, strain hardening epoxy resin or polyurethane. The adhesive 24 forms a ring-shaped sealing which adheres circumferentially at a section 25 of the first end section 7, which section 25 is adjacent to an end adjacent to the end face 23 as well as axially at the end face 23 and which flares conically in direction of the end face 23. Furthermore, the adhesive 24 has a lower volume conductivity than the first isolation 15 of the first lines 2.

The shown high voltage connection may be established by first providing the first line 2 of the traveling wave tube 3 and the second line 4 of the voltage supply unit 5. Subsequently, the crimp connection 8 between the plug 6 and the end section 7 of the first line 2 is made. Likewise, the crimp connection 11 between the socket 9 and the end section 10 of the second line 4 is made. Connecting the plug 6 with the socket 7 follows. Subsequently, the plug 6 and the socket 9 are shrunk over with the shrinking hose 20 which is conductive on its inside.

The end sections 7, 10 with plug 6, socket 9, isolations 15, 16, and the shrinking hose 20 which is conductive on its inside are then heated, and sealing of the end face 23 and of the section 25 by means of the adhesive 24 takes place in the heated state, wherein beforehand a treatment of the surfaces to be moistened with the adhesive 24 was done. Subsequently, it is cooled down to room temperature, wherein the adhesive 24 partially infiltrates the first isolation 15 due to capillary effect where it fills porous sections and cures. Curing takes place at overpressure as to widely reduce the size of possible occurring blows. Subsequently, the shrinking hose 20 which is conductive on its inside is shrunk over with the space flight qualified and high voltage resistant shrinking hose 12.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A high voltage connection between a first line of a traveling wave tube and a second line of a voltage supply unit for the traveling wave tube, comprising:
   a plug connected to an end section of the first line or of the second line by a crimp connection; and
   a socket connected to an end section of the other line by a crimp connection;
   wherein the first line comprises a first strand and the second line comprises a second strand, wherein the strands are surrounded by the isolation of the respective line and wherein an end of the first isolation adjacent to an end face as well as a section of the first strand adjacent to this end of the first isolation are sealed with an adhesive,
   wherein the adhesive seals the end face of the first isolation with respect to the first strand; and
   wherein the adhesive forms a ring-shaped sealing at a line of contact of the end face of the first isolation and the first strand.

2. The high voltage connection of claim 1, wherein the plug and the socket are shrunk over by a first shrinking hose, wherein the first shrinking hose overlaps the plug and the socket and firmly lies on isolation surfaces of isolations of the first line and of the second line.

3. The high voltage connection of claim 2, wherein opposing end sections of the first shrinking hose are sealed with the respective isolation surface of the first line and of the second line by an adhesive.

4. The high voltage connection of claim 1, wherein the plug and the socket are shrunk over directly with a second shrinking hose conductive on an inside, which second shrinking hose is shrunk over with the first shrinking hose which overlaps the plug and the socket and which firmly lies on the isolation surfaces of the first line and of the second line.

5. The high voltage connection of claim 1, wherein the adhesive has a lower volume conductivity than the isolation of the first line.

6. A method for manufacturing a high voltage connection, comprising the steps:
- providing a first line of a traveling wave tube and of a second line of a voltage supply unit, wherein the first line comprises a first strand and the second line comprises a second strand and wherein the strands are surrounded by an isolation of the respective line;
- generating a crimp connection between a plug and an end section of the first line or of the second line;
- generating a crimp connection between a socket and an end section of the other line; and
- connecting the plug with the socket; and
- sealing of an end of the first isolation adjacent to an end face and of a section of the first strand, which section is adjacent to the end of the first isolation, with an adhesive,
- wherein the adhesive seals the end face of the first isolation with respect to the first strand; and
- wherein the adhesive forms a ring-shaped sealing at a line of contact of the end face of the first isolation and the first strand.

7. The method of claim 6, comprising shrinking over the plug and the socket with a first shrinking hose, wherein the first shrinking hose overlaps the plug and the socket and firmly lies on isolation surfaces of the isolations of the first line and of the second line.

8. The method of claim 7, comprising sealing opposing end sections of the first shrinking hose with the respective isolation surface of the first line and of the second line by an adhesive.

9. The method of claim 6, comprising
- shrinking over the plug and the socket with a second shrinking hose which is conductive on an inside and
- shrinking over the second shrinking hose which is conductive on its inside with at least one further shrinking hose.

10. The method of claim 9, wherein the end sections with plug, socket, isolations and second shrinking hose which is conductive on its inside are heated, sealing of the end of the first isolation adjacent to the end face and of the section of the first strand, which section is adjacent to the end of the first isolation adjacent to the end face takes place in heated state by the adhesive, and subsequently is cooled down to room temperature, before the shrinking over of the second shrinking hose which is conductive on its inside with the at least one further shrinking hose takes place.

11. The method of claim 9, wherein curing of the adhesive for sealing the end adjacent to the end face and of the section of the first strand, which section is adjacent to the end of the first isolation adjacent to the end face takes place under overpressure.

* * * * *